US006253235B1

(12) United States Patent
Estes (10) Patent No.: US 6,253,235 B1
(45) Date of Patent: *Jun. 26, 2001

(54) METHOD AND SYSTEM TO TRANSMIT VIDEO/DATA SIGNALS FROM A DEVICE TO A COMMUNICATIONS NETWORK CONNECTION CARD

(75) Inventor: Daniel Lee Estes, Lawrenceville, GA (US)

(73) Assignee: BellSouth Corporation, Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/634,279

(22) Filed: Apr. 18, 1996

(51) Int. Cl.[7] ............................ H04N 7/16; H04N 7/173; H04N 1/00
(52) U.S. Cl. ............................ 709/217; 348/12; 348/13; 455/3.1; 455/5.1
(58) Field of Search ................................. 348/12, 13, 7, 348/6; 455/4.2, 5.1, 6.1, 3.1; 345/327; 709/217; 359/154, 173, 341; H04N 7/16, 7/173

(56) References Cited

U.S. PATENT DOCUMENTS

| | | | |
|---|---|---|---|
| 4,404,514 | 9/1983 | Reichert, Jr. ........................ | 324/52 |
| 4,408,227 | 10/1983 | Bradley ................................ | 358/139 |
| 5,128,619 | 7/1992 | Bjork et al. .......................... | 324/533 |
| 5,410,343 | * 4/1995 | Coddington et al. ................ | 348/7 |
| 5,479,202 | * 12/1995 | Beriont ................................. | 348/12 |
| 5,488,413 | * 1/1996 | Elden et al. .......................... | 348/12 |
| 5,514,965 | 5/1996 | Westwood ............................ | 324/533 |
| 5,528,582 | * 6/1996 | Bodeep et al. ....................... | 348/13 |

(List continued on next page.)

FOREIGN PATENT DOCUMENTS

| | | |
|---|---|---|
| 4435767 A1 | 4/1996 | (DE) . |
| 19630340A1 | 7/1996 | (DE) . |
| WO 94/16534 | 7/1994 | (WO) . |
| WO 95/27347 | 10/1995 | (WO) . |
| WO 97/00571 | 6/1996 | (WO) . |
| WO 97/50249 | 12/1997 | (WO) . |
| WO 99/26356 | 11/1998 | (WO) . |

OTHER PUBLICATIONS

Mills et al., "DVB Specifications for Broadcast–Related Interactive TV Services," *Electronics & Communication Engineering Journal*, Feb. 1997, pp. 38–42.

Claire et al., "Expanding Communication Services to the Local Subscriber", IEEE, vol. 2, Jun. 14–18, 1981, Denver, CO, USA, pp. 2451–2458.

*Primary Examiner*—Andrews I. Faile
*Assistant Examiner*—Vivek Srivastava
(74) *Attorney, Agent, or Firm*—Jones & Askew, LLP (57) ABSTRACT

A system and method for the transmission of signals from a device to a communications network connection card. In particular, a return path is provided for the transmission of signals from a device to an interface where the signals are converted into a format acceptable for transmission to a communications network connection card. The signals are then transmitted to the card and/or may be transmitted to an optical network unit, thereby establishing a connection from the device to systems that employ optical networks. An embodiment also provides a transport system for the delivery of video signals to a device, for the return of analog signals from the device, and for the transmission of digital signals to a signal destination. This embodiment includes a broadband communications module that receives video signals from a signal source and delivers the video signals to the device. The module also receives analog signals from the device and transmits the analog signals to an interface. The interface receives the analog signals, converts the analog signals to digital signals and transmits the digital signals to an optical network unit or a communications network connection card for further transmission to a signal destination.

18 Claims, 5 Drawing Sheets

U.S. PATENT DOCUMENTS

| | | | | |
|---|---|---|---|---|
| 5,541,757 | * | 7/1996 | Fuse et al. | 348/12 |
| 5,550,579 | * | 8/1996 | Martinez | 348/12 |
| 5,557,316 | * | 9/1996 | Hoarty et al. | 348/12 |
| 5,606,725 | * | 2/1997 | Hart | 348/12 |
| 5,615,246 | * | 3/1997 | Beveridge | 348/12 |
| 5,630,204 | * | 5/1997 | Hylton et al. | 348/7 |
| 5,631,903 | * | 5/1997 | Dianda et al. | 348/7 |
| 5,642,155 | * | 6/1997 | Cheng | 348/12 |
| 5,659,351 | * | 8/1997 | Huber | 348/7 |
| 5,684,799 | * | 11/1997 | Bigham et al. | 348/7 |
| 5,712,897 | | 1/1998 | Ortel | 379/22 |
| 5,719,872 | * | 2/1998 | Dubberly et al. | 348/6 |
| 5,790,523 | | 8/1998 | Ritchie, Jr. et al. | 370/241 |
| 5,889,835 | | 3/1999 | Estes | 379/26 |

* cited by examiner

METHOD AND SYSTEM TO TRANSMIT VIDEO/DATA SIGNALS FROM A DEVICE TO A COMMUNICATIONS NETWORK CONNECTION CARD

TECHNICAL FIELD

The present invention relates to the field of video and data communications, and in particular, relates to the field of video and data signal transmission from a device or a broadband communications module to a communications network and/or a communications network connection card.

BACKGROUND OF THE INVENTION

Consider this example: You are home, laid out flat with bad back trouble. The only thing that keeps your flagging spirit from sinking is the pay-per-view movie showing on your television through the paid courtesy of your cable television (CATV) service provider. The movie has ended, but it is the first of a trilogy and you would really like to order and watch the sequels. But this is a Herculean task to accomplish. With your bad back, it is going to be a lot of trouble to get out of bed, to find the telephone, to remember and to dial the pay-per-view telephone number, and to get yourself back into the least uncomfortable position that your back will allow for more movie watching.

Wouldn't it be nice if you could just use a remote control unit with your television to request the delivery of the second and third movie? So, what is the hang up? The hang up is that no cost effective transport system exists for the transmission of signals from a device (such as your set top box) to a signal destination (such as your CATV service provider, video server, etc.) so that you could order your next movie by simply using the remote control unit. Those skilled in the art will recognize the term "set top box" as referring to those elements of the device (whether disposed within a set top box or not) that serve as an interface system between the device and the fiber-and-coax network that transports the signals.

Figure 1:
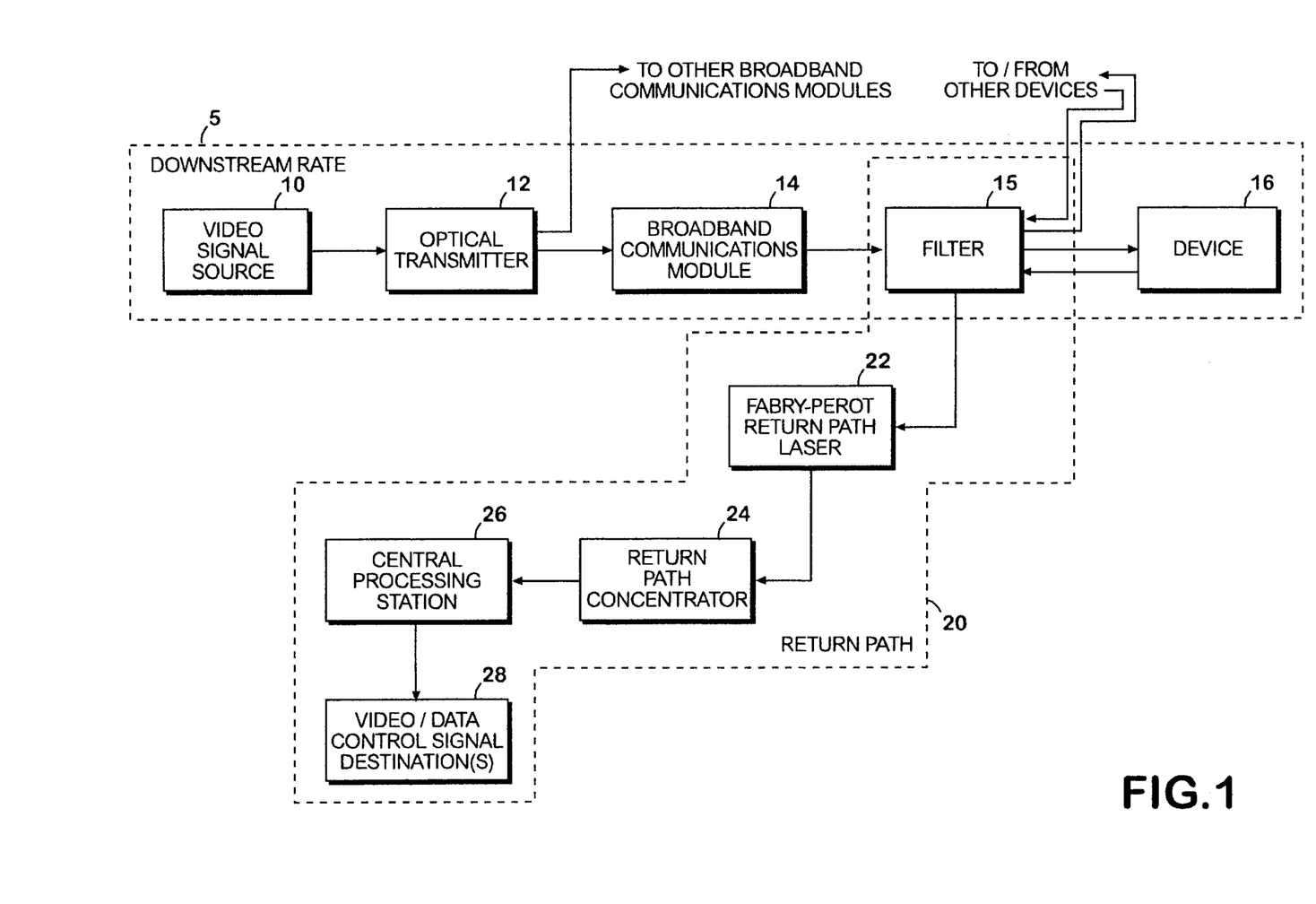
FIG. 1 is a block diagram of a video signal delivery system including downstream delivery from a video signal source to a device, and upstream delivery from the device to a video signal destination.

To understand the problems associated with ordering a movie through use of your television's remote control unit, a general description of CATV service is provided by reference to FIG. 1. FIG. 1 is a block diagram of a video signal delivery system. Generally, the delivery or transmission of a set of video or data signals from a video signal source (such as a CATV service) to a device (such as your set top box) is referred to as "downstream" delivery, a "downstream path" or a "forward path". As illustrated in FIG. 1, a downstream path 5 generally has its beginning at a video signal source 10 that transmits a set of video signals to an optical transmitter 12. For ease of explanation, the term "optical transmitter" is used herein to encompass the elements or mechanisms that receive the video signals from the video signal source 10, that convert, modulate, carry, amplify and/or split the video signals (as necessary) so as to optically transport the signals from the video signal source 10 to one or more local distribution units such as broadband communications module 14. A broadband communications module is also referred to as an analog video unit, an analog network unit, an optical receiver, or in some cases, as an optical node. A broadband communications module 14 typically converts the video signals from optical to electrical, and transmits the video signals through a bandpass filter 15 over coaxial cable to a relatively large number of devices. One such device is device 16 which is also referred to as a set top box, home controller unit, cable ready TV, or residential gateway. The transmission of a set of video signals from a broadband communications module 14 over coaxial cable to a device 16 is referred to as a "drop". Thus, FIG. 1 illustrates a downstream path 5 for the transmission of a set of video signals from a video signal source 10, to an optical transmitter 12, to a broadband communications module 14, to a filter 15 and for ultimate drop to a device 16. The downstream path 5 has been generally described in the context of the delivery of a movie to a subscriber's television, but the description is applicable as well to other video or data signal delivery such as broadcast television, or video, near video on demand, InterNet access, interactive shopping and similar delivery services. For example, a video signal source may include a video server, modulator, head-end or a content provider. A device may include a personal computer, set top box, digital receiver, home controller terminal or gateway.

Generally, the delivery or transmission of a set of video or data signals from a device to a video/data signal destination is referred to as "upstream" delivery or a "return path". As illustrated in FIG. 1, a return path 20 generally has its beginning at a device 16 that transmits a set of video or data signals over coaxial cable to a bandpass filter 15. Typically, the filter recognizes the signals as return path signals, and transmits the signals to other elements or mechanisms for ultimate delivery to their destination. As will be discussed in more detail below, FIG. 1 illustrates a return path 20 for the transmission of a set of video signals from a device 16, to a filter 15 (with return path amplification) to a Fabry-Perot return path laser 22, to a return path concentrator 24, to a central processing station 26, and for ultimate delivery to a video/data signal destination 28. The return path 20 has been generally described in the context of the order of a movie from a subscriber's television, but the description is applicable as well to other video or data signal delivery from a source such as video channel selection, impulse pay per view requests, shopping requests, and enhanced video control signals for stopping, reversing or accelerating the playback of a video or data source.

In the above description of a downstream path 5 and a return path 20, reference was made to elements such as the video signal source, etc., but the actual mechanism for transporting the video or data signals among the elements was not spelled out in all cases. This omission was deliberate so as to provide a little historical discussion at this point. In the early days of cable television, CATV service providers used coaxial cable as the mechanism for transporting the video signals from the video signal source to the device. Hence, the term "cable company". But coaxial cable has its limitations as a transport mechanism, and cable companies soon realized the advantages offered by fiber optics to the transport of video signals. Most CATV service now is provided over a fiber-and-coax network, which is a hybrid network that provides duplex voice and data circuits and simplex broadband channels to the public. Optical fibers are used for signal transport from a video signal source to local distribution points such as the illustrated broadband communications module 14. At such a local distribution point, the signal streams are converted from optical signals to electrical signal streams, and distributed ("dropped") to individual homes over shared coaxial cable.

CATV service providers recognized the potential of fiber optics for the transport of video/data signals and provided fiber-and-coax networks for the downstream path of delivery of video signals. But, for the most part, CATV service providers have until recently ignored and failed to provide a signaling return path for video/data signals. The fiber-and-coax networks generally were not set up to handle video/ data signals that were transmitted from a device 16 (such as your set top box) back through the optical transmitter 12 to the video signal source 10. One reason that CATV service providers (and others) ignored the signaling return path is that, until recently, there was little possibility that a subscriber would have information to transmit by return path. In its early days, CATV was developed for subscribers who lived outside the reach of over-the-air broadcast television stations. These early subscribers paid a flat fee for service. No signaling return path was necessary.

Another reason that CATV service providers (and others) ignored the return path is based on economics. Alterations or additions to a fiber-and-coax network to provide a signaling return path have not been cost justified for several reasons. For example, the proposed alterations and additions would be extensive and expensive. Further, until recently, it has been believed that even with "pay-per-view services" a subscriber would have only a small amount of information to transmit by return path. Thus, the cost did not justify the changes that were necessary.

But times have changed. The personal computer has changed the attitude of the public. Surveys have demonstrated that the majority of Americans cannot imagine living without a personal computer. Through a personal computer, a user has access to all sorts of information. Through mechanisms such as local area networks, wide area networks, the InterNet, and others, a user is able to interact with others who are in the network and to interact with computer programs, information and services. In other words, with a networked computer, a user has a "downstream path" for the receipt of information, and a "return path" for the transmission of information. Having been educated by networked computers to the advantages of the exchange of information, a user is surprising dismayed to find that CATV service generally is only "one-way", i.e., downstream path only. There is no convenient, efficient, economical return path. How Neanderthal!

Within the next few years, the need for multichannel, bi-directional video/data transmissions will multiply within every home and enterprise because of the coming integration of video/data information into the conduct of business, the process of learning and other aspects of life in the twenty-first century.

SYNCHRONOUS RETURN PATH SYSTEM

At least one company has given some thought to the provision of a signaling return path in a fiber-and-coax network: Synchronous Group, Inc., San Jose, Calif. Synchronous has a return path system that includes a product known as a single home receiver or a multiple dwelling unit receiver. The Synchronous system is explained in connection with FIG. 1. Generally, in the Synchronous return path system, a set of analog video/data signals are received from the device 16, converted from electrical to optical signals, and transmitted to the video/data signal destination 28. If necessary, the signals are converted from analog to digital only at the video/data destination 28 or as a relatively last step in transmitting the signals to the video/data destination 28.

More particularly described, the Synchronous return path system works in conjunction with standard equipment provided in connection with mechanisms that accommodate CATV service. For example, a device (such as your set top box) is typically equipped with a radio frequency modem that outputs digital signals with an analog modulated bit stream in quaternary phase shift keying (QPSK) or similar format. Typically, the modem is part of the set top box.

In the return path, the signals come out of the set top box at a frequency between five to forty MHz on the coaxial cable drop to a filter 15. In FIG. 1, filter 15 is shown as a separate block from the broadband communications module 14, but generally, the filter is incorporated as part of such a module 14. At the broadband communications module, signals from hundreds of devices may be combined and amplified. Typically, the amplification is carried out at a return path amplifier (not illustrated). This combination and amplification leads to the introduction of a lot of noise, thereby distorting the signals. As illustrated in FIG. 1., after the signals are combined and amplified, they are transmitted to a Fabry-Perot return path laser 22. The laser is used to convert the combined signals from electrical to optical signals. It would be extremely uneconomical to provide a fiber for the transport only of these combined converted signals received from just the device 16 or group of devices served by a single broadband communications module 14. Thus, to lessen the cost of return path system, the converted combined signals are generally modulated and are passed to a return path concentrator 24. At the return path concentrator 24, the converted, combined and modulated signals are further modulated with all of the signals that have been sent for transmission along the return path at that time. These signals are modulated into 55–600 MHz of spectrum and transmitted to the central processing station 26. At the central processing station 26, the signals are converted from optical to electrical signals and are demodulated into their respective five to forty MHz bandwidths. After this demodulation, the signals are provided to their respective video/data signal destinations. At this point, the signals also may be converted from analog to digital. One destination may be a local area network such as a selected EtherNet. In that case, the signals may be routed to an EtherNet card for connection and routing pursuant to an EtherNet protocol to a further destination.

Synchronous Group is to be commended for its foresight in developing a return path system. But this system has drawbacks. As noted, the combination of quite a few sets of video signals leads to the introduction of noise and results in signal distortion. Electronics must be provided to adjust and to compensate for the noise. These electronics themselves may present trouble by the introduction of noise, by error, by malfunctions, etc. Needless to say, such electronics may be expensive to design and engineer, to install, to set up to work optimally, to maintain, and to replace. Thus, these electronics may effectively raise the cost of a broadband communications module and its use above the level that the market may bear for return path services.

Another drawback of the Synchronous return path system is the use of the Fabry-Perot return path laser. Such a laser is relatively expensive in the context of return path CATV services for small numbers of subscribers. If such a laser is necessary for each broadband communications module, then the Synchronous system is too expensive for commercial use. As further drawbacks to the Synchronous system, the same criticisms leveled at the system in connection with the possible trouble, expense, maintenance, repair and adjustment of the extra electronics in the broadband communications module may be said in connection with the use of the Fabry-Perot return path laser 22, the return path concentrator 24 and extra or adjusted elements necessary to accommodate the Synchronous system in each central processing station 26.

Further, another drawback of the Synchronous return path system is that it requires demodulation of each of the individual 5–40 MHz return paths at some central location.

This demodulation is necessary before handoff to a local area network, wide area network or EtherNet router. Demodulation costs are a big part of costs in a return path system.

Another drawback of the Synchronous return path system is that it is an analog transmission system. The signals from device 16 are transmitted in analog form until nearly the end of their journey. Thus, there is little possibility or opportunity for sampling the signals or otherwise diverting them in a useful form for use with other systems and/or elements. In other words, to deliver video/data signals along the Synchronous return path system to a selected EtherNet destination, the video/data signals must travel the entire return path from the device 16, to the broadband communications module 14, the Fabry-Perot Return Path laser 22, the return path concentrator, the central processing station 26, and only then to the selected EtherNet destination 28. Along the way, the signals may be lost, distorted, etc.

OPPORTUNITIES PRESENTED BY THE TELECOMMUNICATIONS SYSTEM

As noted above, surveys have demonstrated that most people cannot imagine living without a personal computer. An even greater number of people, it may be assumed, cannot imagine living without the telecommunications service they have come to expect. We are not just talking telephones. We are talking about interactive lines of communication including conventional telephone service, facsimile service, integrated services digital network (ISDN), and other digital and data services including EtherNet connections. We are talking about a system that allows for the interaction between people, between people and computers (or other mechanical devices) and between computers (or other mechanical devices).

With the myriad communication possibilities that are afforded through the telecommunications network, it is a significant drawback that CATV services do not provide any kind of an economical and practical connection to the telecommunications network. This is a failing shared by the Synchronous return path system.

In summary of the background, CATV service is hampered in the field of communications by its failure generally to provide a way for a user to send information along a return path from the user's device to a video/data signal destination. The Synchronous system offers a return path for video/data signals, but only in a manner that includes additional elements that add cost, installation, maintenance and failure concerns to the system. Further, the Synchronous system has a significant drawback in its transmission of the video/data signals in modulated analog form along the return path. Accordingly, there is a need in the art for a system that provides for a return path for the transmission of video/data signals from a device to a video/data signal destination. In particular, there is a need for a system that provides for a return path that is relatively inexpensive to set up, that functions well with a minimum of equipment and minimum of modification to standard elements, and that is easy to maintain and service. Especially, there is a need for a system that provides a return path that minimizes the impact of noise on signal transmission. Further, there is a need for a system that provides a return path so that a connection may be made to the telecommunications or other communications network. Finally, there is a need for a system that provides an interface system that converts analog signals received through a coaxial cable interface from a device to digital signals that are appropriate for communication with other networks such as EtherNet.

SUMMARY OF THE INVENTION

The present invention satisfies the needs in the art. Stated generally, the present invention allows for a connection between: (1) the downstream path of a video/data signal transmission system from a signal source to a device; and (2) the return path from the device to a signal destination. With this connection, the range of broadband services that are available to a subscriber is greatly expanded. The present invention allows for cost effective delivery of analog and digital video services and integrated delivery of high bandwidth data communications and telecommunications services.

Still stated generally, the present invention provides a return path for the transmission of signals from a device to a signal destination. This return path minimizes signal distortion. In the preferred embodiment, an interface is provided so that the analog signals transmitted over a coaxial cable interface from the device to a broadband communications module are converted to digital signals. In digital form, the signals may be further formatted as appropriate for further communication with any wide bandwidth communications network. The signals may be formatted in communications network connection format for transmission to a communications network connection card such as an EtherNet card. The signals also may be transmitted to an optical network unit, thereby connecting the broadband communications module to the systems that employ optical networks.

More particularly stated, a first embodiment of the present invention is a signal transport system for the delivery of video signals to a device, for the return of analog signals from the device, and for the transmission of digital signals to a signal destination. This embodiment includes a broadband communications module that receives video signals from a signal source and delivers the video signals to the device. The broadband communications module is further operative to receive analog signals from the device, and to transmit the analog signals to an interface. The interface receives the analog signals, converts the analog signals to digital signals and transmits the digital signals to an optical network unit. The optical network unit further transmits the digital signals to a signal destination. In the preferred embodiment, the broadband communications module includes an optical receiver that receives the video signals from the signal source and transmits the video signals to a filter. The filter transmits the video signals to a coaxial cable interface, which in turn, transmits the video signals to the device. With respect to the receipt of analog signals from the device, the broadband communications module preferably includes a coaxial cable interface that receives the analog signals from the device and transmits the analog signals to the filter. The filter then transmits the analog signals to a converter and the converter converts the analog signals to the digital signals. Preferably, the converter formats the digital signals in a communications network connection format, and the converter transmits the digital signals in the communications network connection format to a communications network connection card. The communications network connection card may be adapted for use in the optical network unit, and may transmit the digital signals to an optical receiver/transmitter or a communications network.

In addition, the present invention may include an alarm monitoring system so that monitoring may take place of a radio frequency output alarm or an optical signal alarm with respect to the video signals delivered to the device. The present invention also may include a control feature such as a turn-on feature or a turn-off feature with respect to the video signals delivered to the device, whereby said video signals may be, respectively, turned-on for delivery to said device, or turned-off for delivery to said device. Further, the present invention may include a drop test unit for testing the electrical characteristics of the video signals or to conduct a continuity check with respect to the video signals.

The present invention also provides an embodiment that is a signal transport system for the receipt of analog signals from a device and for the transmission of digital signals to an optical network unit. This embodiment includes a broadband communications module to receive analog signals from the device, and to transmit the analog signals to an interface. The interface converts the analog signals into digital signals, and transmits the digital signals to an optical network unit. Preferably, in this embodiment, the interface is operative to convert the analog signals into digital signals in a communications network connection format and to transmit the digital signals in the communications network connection format to a communications network connection card. The interface may be adapted for use in the broadband communications module as may be the communications network connection card.

In addition, the present invention provides an embodiment that is a signal transport system for receipt of analog signals from a device and for the transmission of digital signals to a communications network connection card. The system includes an interface that receives the analog signals, that converts the analog signals into digital signals in a communications network connection format, and that transmits the digital signals in the communications network connection format to the communication network connection card. The interface or the communications network connection card may be adapted for use in the device. Alternatively, the interface or the communications network connection card may be adapted for use in a broadband communications module.

In yet another embodiment, the present invention provides a method for transmitting signals from a device to a communications network connection card in a signal transport system. Pursuant to the method, analog signals are received from the device, are converted to digital signals in a communications network connection format, and transmitted to the communication network connection card. Preferably, in this method, video signals are delivered to the device from the signal source. Further, a radio frequency output alarm or an optical signal alarm may be monitored with respect to the video signals delivered to the source, and the results of the monitoring reported to an alarm monitoring system. In addition, a control feature may be implemented with respect to the video signals delivered to the device with the control feature being a turn-on feature or a turn-off feature, whereby the video signals may be, respectively, turned-on for delivery to the device, or turned-off for delivery to the device. Also, a drop test unit may be implemented with respect to the video signals delivered to the device. The drop test unit may test the electrical characteristics of the video signals or conduct a continuity check with respect to the video signals.

Advantageously, the present invention allows for a connection between CATV type services and communication services. In particular, the present invention allows for a connection between, on the one hand, CATV types services in the downstream path of video/data signal transmission to a device and, and on the other hand, communication type services in the return path of the video/data signal transmission from the device. With this connection, the range of broadband services that are available to a subscriber is greatly expanded. In particular, the return path of the video/data signal transmission may include optical networks, such as fiber-in-the-loop networks, thereby providing the subscriber with communication services of great bandwidth capacity.

As a further advantage, the present invention enhances the value of communication systems that are linked to the CATV type services. For example, an optical network including a fiber-in-the-loop network or system becomes more valuable through the connection provided by the present invention because the optical network is able to provide additional and improved services. One such service that may be provided is a connection to the public switched telephone service through a POTS card in an optical network unit. Another service is a connection to another communications network such as an EtherNet system through an EtherNet card. Yet another service is that a service provider may activate, terminate, alarm, check or test the service provided to one or more subscribers from the optical network through the connection provided by an embodiment of the present invention.

In particular, the present invention improves over the Synchronous return path system, and similar systems, in that the present invention eliminates much of the electronics required for traditional upstream communication such as return path amplifiers, return path laser transmitters, return path receivers, and return path demodulators.

Therefore, it is an object of the present invention to provide an improved method and interface system to transmit video and data signals in a return path from a broadband communications module to an optical network.

It is also an object of the present invention to provide an improved return path that minimizes signal distortion of the signal transmission.

It is a further object of the present invention to provide for the conversion of analog signals to digital signals in the return path so as to allow for the transmission of signals to any wide bandwidth communication network.

In addition, it is an object of the present invention to provide an interface so that analog signals transmitted from a device over a coaxial cable interface to a broadband communications module are converted to digital signals.

Further, it is an object of the present invention to provide an interface so that analog signals transmitted from a device may be converted to digital signals for further transmission to a communications network connection card.

That the present invention and the preferred embodiments thereof overcome the drawbacks set forth above and accomplish the objects of the invention set forth herein will become apparent from the detailed description of the preferred embodiments to follow.

DETAILED DESCRIPTION

Referring now to the drawings, in which like numerals indicate like elements throughout the several figures, the embodiments of the invention will be described in detail.

An Overview of the Present Invention in its Preferred Environment

Figure 2:
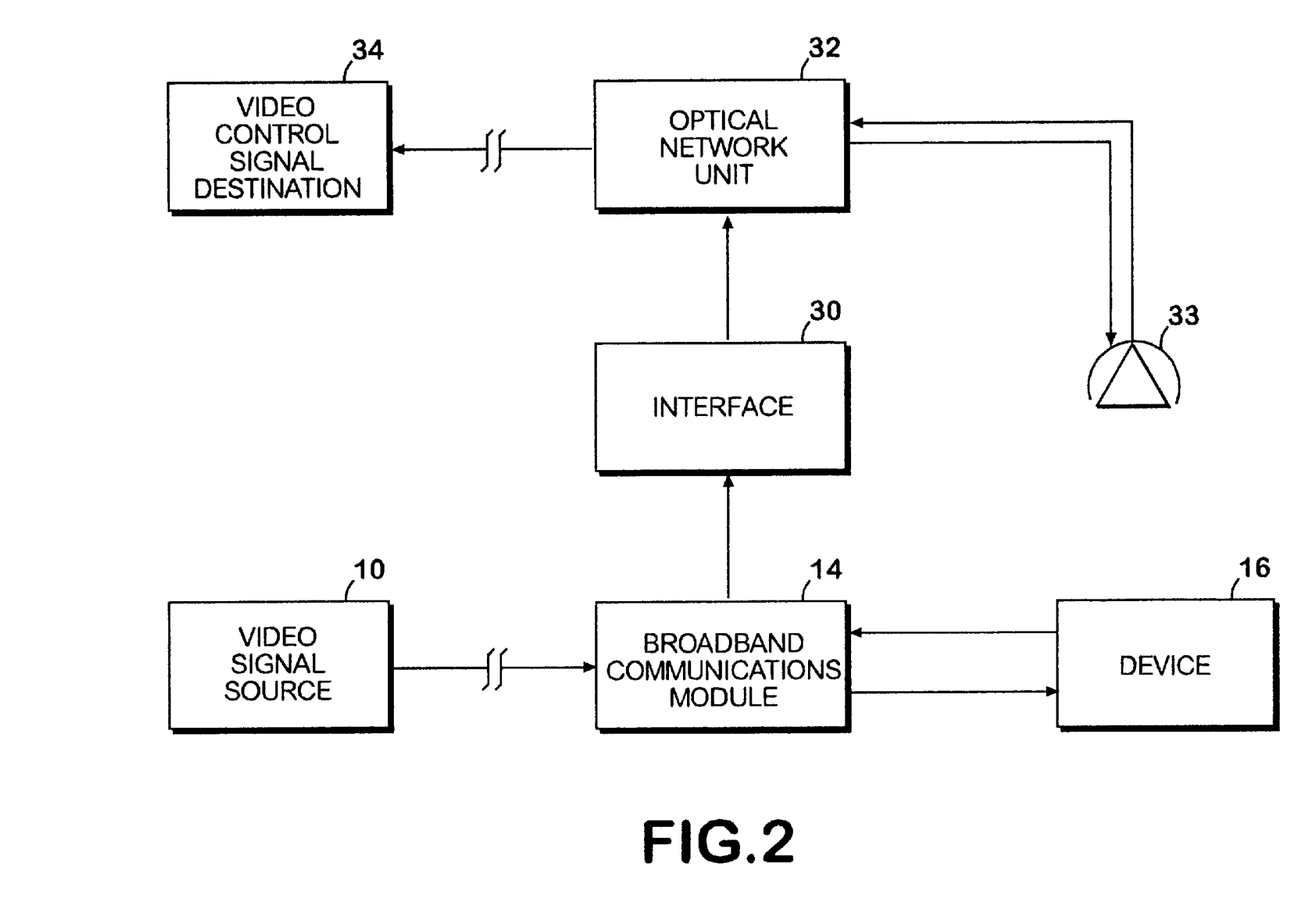
FIG. 2 is a block diagram of the preferred signal transport system including downstream delivery from a video signal source to a device, and upstream delivery from the device to a video signal destination.

An overview of the present invention is described in connection with the simplified block diagram of FIG. 2. In particular, FIG. 2 illustrates the preferred signal transport system including downstream delivery from a video signal source 10 to a broadband communications module 14 and to a device 16. FIG. 2 also illustrates the preferred return path from the device 16 to the broadband communications module 14, to an interface 30, to an optical network unit 32 and ultimately, to a video signal destination 34. In the preferred embodiment, video signals are transmitted, but it will be appreciated that data signals may be transmitted in the same manner. FIG. 2 also illustrates a two-way connection for the transport of signals between optical network unit 32 and telephone 33, where telephone 33 represents conventional telephones, wireless telephones, modem connections, and any other telecommunications device. Typically, telephone 33 and device 16 will be located in the same place, such as a subscriber's home or office.

Pursuant to this preferred embodiment, in downstream delivery, a video signal source 10 provides video signals. As used herein, a video signal source is used synonymously with the terms "signal source", "content provider" or "headend". Those skilled in the art will recognize that a content provider generally is an originator of signals. On the other hand, a headend may originate the signals or receive the signals from other sources such as from satellite transmissions, off-air antenna transmissions or digital video transmissions. A headend generally modulates video signals to a particular frequency, typically a stacked radio frequency (RF). Thus, as used herein, the term "video signal source" includes myriad types of signal or content providers including CATV service providers, video servers and the like. For simplicity, the Figures herein only illustrate a single video signal source 10, but it will be appreciated by those skilled in the art that more than one video signal source may serve a particular broadband communications module, a device or a subscriber. The description herein as to the illustrated video signal source 10 is applicable to other sources as well.

Generally, the signals that are provided by the video signal source 10 are video signals in analog form. Referring to FIG. 2, the break in the transmission line between video signal source 10 and broadband communications module 14 indicates that other elements may be present between these two elements, but are not shown in this drawing. Some of these omitted elements are discussed in more detail in connection with FIG. 3 below.

In the preferred embodiment, the broadband communications module 14 is the Synchronous group single home receiver of the Synchronous group multiple dwelling unit receiver. This Synchronous product may be modified as explained herein to incorporate the functions of the present invention. Alternatively, these functions may be provided separately or as part of another element such as the device or the optical network unit. Other broadband communications modules are available from Scientific Atlanta, Norcross, Ga.; ADC, 999 Research Parkway, Meriden, Conn.; CCOR Electronics, Inc., State College, Pa.; and General Instruments, Harboro, Pa. For simplicity, the Figures herein illustrate only a single broadband communications module. It will be appreciated by those skilled in the art that the video signal source 10 may send and typically sends signals to multiple broadband communications modules. The description herein as to the illustrated broadband communications module 14 is applicable to these other units as well. The preferred broadband communications module is also discussed in more detail in connection with FIG. 4 below.

From the video signal source 10, the broadband communications module 14 receives signals destined for device 16, and in a conventional manner, the broadband communications module delivers the signals to the device. Typically, the broadband communications module delivers or "drops" the signals to the device by use of a coaxial cable. For simplicity, the Figures herein illustrate only a single device 16. It will be appreciated by those skilled in the art that the broadband communications module 14 may send and typically sends signals to multiple devices. As is discussed below in connection with FIG. 3, the preferred broadband communications module serves one to eight devices. The description herein as to the illustrated device 16 is applicable to these other devices as well.

With the signals received from the broadband communications module 14, a subscriber may have a movie delivered from the video signal source 10 through the broadband communications module 14 to his/her television 16. In this example, the device 16 has been defined as a television. However, as used herein, the term "device" is to be understood to have a broader definition and to encompass other devices that can receive and transmit signals such as, a set top box, a personal computer equipped with a video card, or a home video terminal.

With respect to the return path, in the preferred embodiment, the device 16 provides the broadband communications module 14 with signals. Preferably, these signals are analog signals (and in particular, modulated analog signals in that the analog signals include digital content) transmitted from the device 16 over the coaxial cable interface (i.e., back over the "drop") to the broadband communications module 14. The broadband communications module 14 then transmits these signals to an interface 30. More detail regarding the interface is provided in connection with FIG. 4 below. The interface 30 receives the signals from the broadband communications module and converts the signals into a converted set of signals. Preferably, the analog signals are converted to digital signals. The signals then are transmitted to an optical network unit 32.

As used herein, an optical network unit is a terminating element in an optical communications network in that an optical network unit generally connects one or more telecommunication devices (such as telephone 33) through conventional twisted pair telephony to the optical network. The term "optical network unit" is used herein pursuant to the definition thereof found in the following BellCore document: *General Requirements and Objectives for Fiber in the Loop Systems,* TR-NWT-00909, Issue 1, December 1991. This document is incorporated herein by reference. For simplicity, the Figures herein only illustrate a single optical network unit 32, but it will be appreciated by those skilled in the art that more than one optical network unit may be present within the system, and that each optical network unit may serve more than one device. The description herein as to the illustrated optical network unit 32 is applicable to these other units as well. In the preferred embodiment, the optical network unit is a Digital Intelligent Subscriber Carrier System (DISC*S) Fiber in the Loop CAD 12 optical network unit manufactured by RelTec, Franklin Park, Ill. Further details regarding the optical network unit 32 are provided in connection with FIG. 4 below.

Upon receipt of the converted signals, the optical network unit 32 then is further operative to transmit the converted set of signals to a signal destination 34. For simplicity, FIG. 2 only illustrates a single signal destination 34, but it will be appreciated by those skilled in the art that the optical network unit may provide the converted signals to more than one signal destination. The description herein as to the illustrated video signal destination 34 is applicable to other destinations as well. Further, as used herein, a signal destination may refer to any of the many types of destinations to which signals may be transmitted for whatever reason. For example, a signal destination may include a CATV service provider, a personal computer, other computers, a video server, or other servers or video selection controller.

Referring still to FIG. 2, the break in the transmission line between optical network unit 32 and video signal destination 34 indicates that other elements may be present between these two elements, but are not shown in this drawing. For example, such an omitted element may be the transport mechanism, such as a fiber-in-the-loop (FITL) network, that carries the signals from optical network unit 32 to video signal destination 34. Some of these omitted elements are discussed in more detail in connection with FIG. 3 below.

To summarize the general overview of the preferred return path of the present invention, a subscriber or user may use device 16 to transmit signals (preferably modulated analog with digital content) to the broadband communications module 14. For example, the subscriber may order a movie using the remote control unit and television. In response to receipt of the signals, the broadband communications module 14 then transmits these signals to an interface 30, which converts the signals (preferably from analog to digital), and further transmits the converted signals to an optical network unit 32. In turn, the optical network unit transmits the signals to a video signal destination. To use the movie example again, the signals for ordering the movie are received by the broadband communications module, converted to digital signals by the converter, and sent to the CATV service provider by the optical network unit 32.

The Optical Transmitter in the Downstream Path

In the delivery of video signals, the CATV industry is moving towards fiber optic facilities deeper and deeper into the hybrid network. In other words, the hybrid network is becoming less of a hybrid and more of an optical network. Most of the CATV industry has stopped fiber deployment at 2000 homes per local distribution unit. But some CATV industry players have carried fiber deployment through to local distribution units such that each unit services 500 homes or even only 125 homes. A particular company, Synchronous Group has developed a downstream path system that pushes fiber penetration down to a very few number of homes (maybe as few as one to eight) and that is still economical. This referenced Synchronous system includes the signal home receiver or multiple dwelling unit receiver referenced above. Further information regarding this Synchronous system may be obtained from Synchronous Group. This Synchronous system is described in general below in connection with a discussion of the preferred optical transmitter 12.

As discussed above, the term "optical transmitter" is used herein to encompass the elements or mechanisms that receive the video signals from the video signal source 10, that convert, modulate, carry, amplify and/or split the video signals (as necessary) so as to optically transport the signals from the video signal source 10 to one or more local distribution units such as broadband communications module 14. In the preferred environment, the optical transmitter comprises the above referenced Synchronous system. This Synchronous system includes an externally modulated 1550 nanometer optical transmitter and a cascade of high output Erbium doped fiber amplifiers (EDFAs) to boost the optical video signals for delivery to one or more local distribution units. The use of high output amplifiers provides for a high optical split ratio in the delivery of video signals so that a single broadband communications module may service as few as one to eight devices (also referred to as living units), and that so that multiple broadband communications modules may receive the signals from a single EDFA location. By dropping the number of devices serviced by a broadband communications module to as few as one to eight devices, an optical network for video delivery is economical when compared to a conventional coaxial cable and amplifier network.

Figure 3:
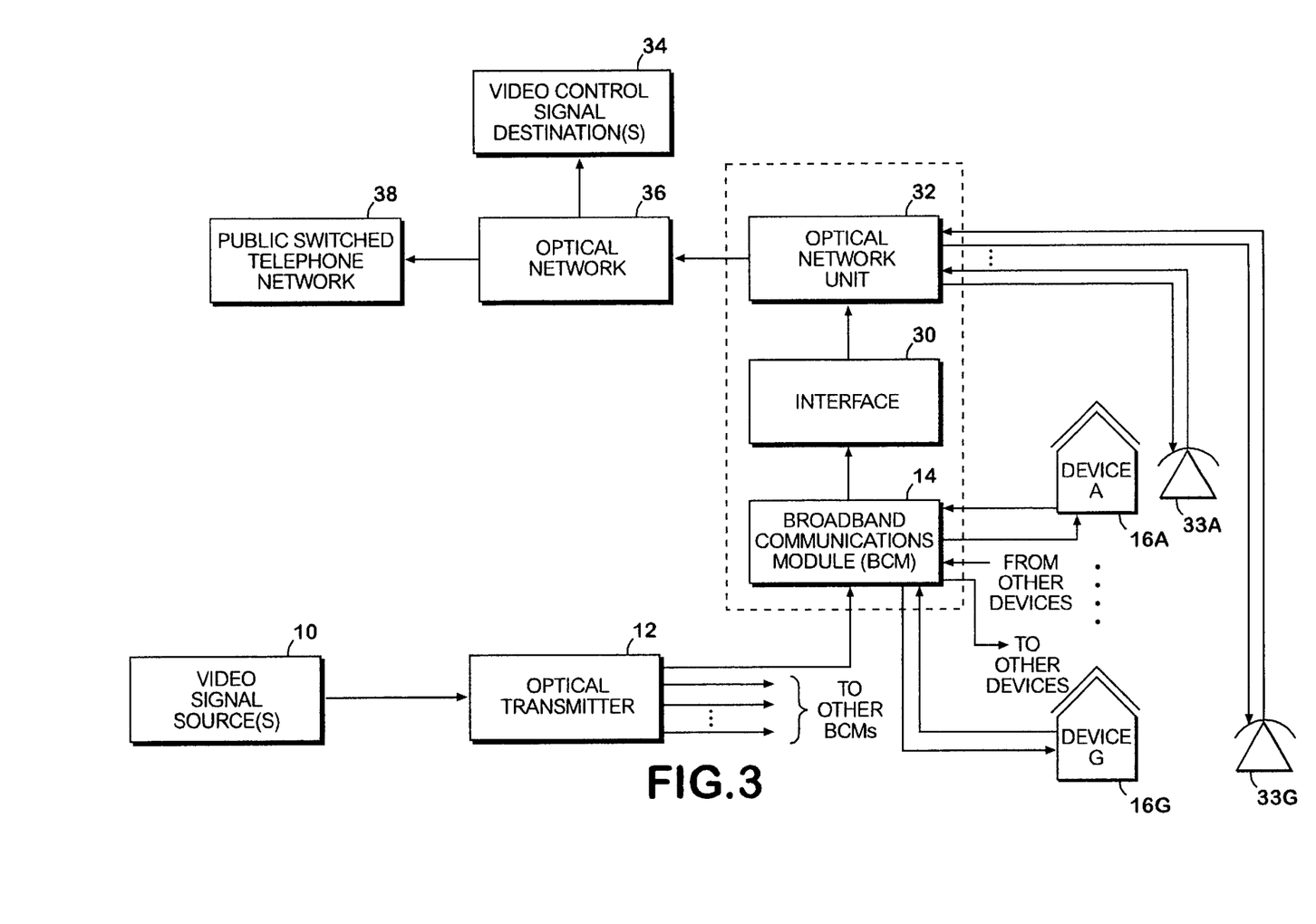
FIG. 3 is a block diagram including more detail of the preferred environment of the preferred signal transport system illustrated in FIG. 2.

FIG. 3 is a block diagram including more detail of the preferred environment of the preferred signal transport system as illustrated in FIG. 2. In particular, the multiple transmission lines from optical transmitter 12 to broadband communications module (BCM) 14 and to other BCMs indicate that the video signals may be provided to one or more broadband communications modules. In addition, FIG. 3 illustrates that broadband communications module 14 transmits and receives signals to and from one or more devices 16A–16G.

The Optical Network in the Return Path

As discussed above in connection with the preferred return path of the present invention, after the optical network unit 32 receives the converted signals from the interface 30, the optical network unit 32 is operative to transmit the signals to one or more video signal destinations 34. In the preferred environment, the optical network unit 32 may transmit the converted signals to an optical network 36. It will be appreciated by those skilled in the art that the optical network unit 32 may be adapted as part of the optical network 36, rather than as a separate unit. Preferably, the optical network 36 is a fiber-in-the-loop (FITL) optical network, which can carry signals to provide conventional telephone service, facsimile service, integrated services digital network (ISDN), and other digital and data services including EtherNet connections. From the optical network 36, the signals may be further transmitted to one or more video signal destinations 34. For example, signal destinations that may be connected to the optical network 36 include: video control networks, private data networks and signaling networks. Also from the optical network 36, the signals may be further transmitted to the public switched telephone network 38. Advantageously, through the inclusion of an optical network in the return path, a user may send signals from a device along a return path that includes a broadband communications module, an optical network unit, an optical network and to video signal destinations such as the public switched telephone network.

Description of the Interface

In the general description of the preferred return path of the present invention, it was explained that the broadband communications module preferably receives modulated analog signals carrying digital content from the device 16. The broadband communications module 14 then transits these signals to an interface 30 where the analog signals are demodulated to digital signals and then transmitted to an optical network unit 32. Additional details regarding the preferred broadband communications module, the interface and the optical network unit are now presented in connection with FIG. 4. Reference first is made to FIGS. 2 and 3 wherein interface 30 is illustrated as a functional block separate from broadband communications module 14 and optical network 32. In the preferred embodiment, no separate element comparable to the interface block 30 exists. Rather, the functions of an interface between the broadband communications module and the optical network unit are preferably provided by certain functions carried out in the broadband communications module, and to a lesser extent, in the optical network unit, as is described below. Alternatively, as described below in connection with FIG. 5A the functions of the interface may be incorporated as part of or associated with the device or with the optical network unit.

Figure 4:
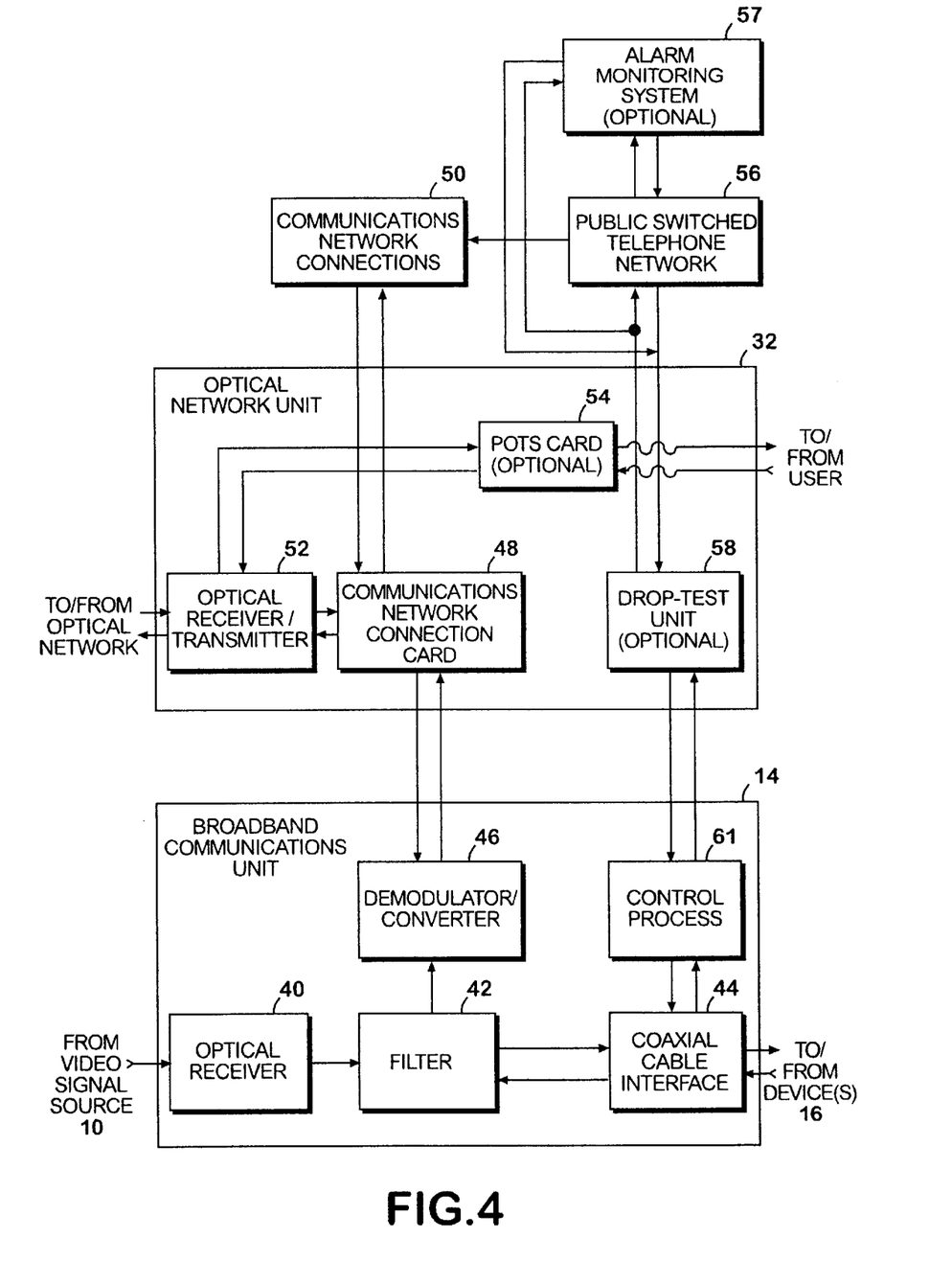
FIG. 4 is a block diagram including more detail of certain elements of the preferred signal transport system illustrated in FIGS. 2 and 3.

FIG. 4 illustrates certain components of the preferred broadband communications module 14. In particular, it will be appreciated that the broadband communications module 14 receives modulated analog signals from the video signal source 10 at the optical receiver 40. The analog signals are transmitted at a frequency between 55–860 MHz and may be transmitted at a frequency as high as 1 GigaHz. These signals are passed to a filter 42, which preferably is a bandpass filter, and in particular, is a diplex filter. In a conventional manner, the filter 42 passes the analog signals to a coaxial cable interface 44 for further transmission to the device 16.

With respect to the return path, the device 16 (or devices) transmits analog signals to the coaxial cable interface 44. In an alternate embodiment, the coaxial cable interface 44 may be provided with multiplex signal inputs/outputs (RF combiner/splitter) such that if more than one signal of the same type is received, then these signals may be combined for processing. The coaxial cable interface 44 also may be referred to as a "receiver" in the sense that it is a receiver of signals from device 16.

From the coaxial cable interface 44, the signals (single or multiplexed) are transmitted to the filter 42. Preferably, the analog signals from the device 16 are sent at a frequency between 5–40 MHz, and in the preferred embodiment, at a frequency of 15.45–17.756 MHz. Upon receipt of the analog signals from the coaxial cable interface 44, the filter 42 transmits the signals to a demodulator/converter 46. In the preferred embodiment, the demodulator/converter is a QPSK demodulator to EtherNet converter.

In the demodulator/converter 46, the signals are preferably converted to digital signals, and in particular, are converted to digital signals in an EtherNet format such as 10 Base T or 10 Base F. As those skilled in the art will understand, the signals received from the device in the demodulator/converter 46 are preferably combined with signals from other devices for transmission to one or more signal destinations. Signals from more than one device are passively combined in the upstream connection through the diplex filter.

After conversion, the converted signals are preferably passed to the optical network unit 32 in a manner well known to those skilled in the art. In the preferred embodiment, the converted signals are passed to one or more communications networks through one or more communications network connection cards 48. The communications network connection card of choice is an EtherNet card preferably adapted for inclusion in the optical network unit 32. An EtherNet card is a relatively inexpensive and popular communications network connection card. Such an EtherNet card may be obtained from Reltec, Franklin Park, Ill. Those skilled in the art will recognize that other communications network connection cards may be used as well, or in substitution thereof. Advantageously, conversion of the signals to digital format, and provision of the digital signals to a communications network connection card 48 allow the signals to be conveniently transmitted to one or more signal destinations. For example, from an EtherNet card, the signals may be transmitted in a manner well known to those skilled in the art to an EtherNet router 50 (also referred to as a signal destination). Thus, the subscriber or user of the device 16 is able to communicate through the preferred return path with signal destinations such as the EtherNet router 50. It will be appreciated that the provision of the digital signals to the EtherNet router 50 (or other communications network connection) in the EtherNet format (or other communications network format) allows the signals to be directly interfaced with an EtherNet router (or other router) without the need for additional elements or electronics. By avoiding the use of additional elements or electronics, the present invention provides an economical, convenient, reliable system for communications between a device and a signal destination through the use of a connection between a broadband communications module and an optical network unit.

As noted, the converted signals from the demodulator/converter 46 are preferably transmitted to a communications network connection card 48 adapted for use in the optical network unit 32. From the card 48, the signals may be routed to one or more destinations. The routing of these signals is accomplished in a conventional manner well known to those skilled in the art. The signals may be routed in a conventional manner through an optical receiver/transmitter 52 to an optical network 32. Typically, the signals are transmitted in a conventional manner from the optical receiver/transmitter at 1310 nanometers. In addition, from the card 48, the signals may be multiplexed in a conventional manner with signals from "POTS" cards 54 for further transmission to the public switched telephone network 56.

Preferred Alarm and Control Features of the Present Invention

Advantageously, the connection of the broadband communications module and the optical network unit allows for the implementation of certain testing, alarm and control features or system with respect to the services offered to the subscriber or user associated with device 16. With respect to the testing and alarm features, a radio frequency (RF) output alarm and an optical signal alarm may be implemented with the present invention. For example, referring to FIG. 4, one or more alarm features may be preferably implemented and serviced through the connection of an alarm monitoring system 57 to the public switched telephone network 56, and/or through certain elements of the optical network unit 32, then to the broadband communications module 14, and ultimately to the coaxial cable interface 44 servicing the particular device 16 associated with a subscriber. A connection may be made through the testing systems of the telephone network 56 to drop test unit 58 to control process 60 and then to coaxial cable interface 44. In this connection, signals are exchanged between the alarm monitoring system and the control process 60 through the described path. These signals may activate a program in the control process 60 in a manner well known to the skilled in the art. The control process 60 responds to the receipt of the signals from the alarm monitoring system and takes action as provided by its programming. This action may involve interaction with the signals passing through the coaxial cable interface 44, and/or interaction with the device 16. Alternatively, the action may involve return of information to the alarm monitoring system. An advantage of this feature of the present invention is that it eliminates the need for any special status monitoring receivers or operation systems.

An example of an alarm feature is a feature that provides an alarm with respect to the loss of RF signal or loss of optical input signal. For example, if the video providers' RF signal is not recoverable at the broadband communications module, then a sensor detects the loss of RF signal and triggers a change in the state of the control unit (control process). This change then is reported to the alarm monitoring system 57. As another example, the alarm monitoring system may be operated to monitor a radio frequency output to trigger an alarm upon degradation of the output delivered to the device or to trigger the alarm upon degradation of an optical signal input to the broadband communications module.

The preferred embodiment of the present invention also includes control features applicable to the services provided to the subscriber or user of the device 16. One example of a control feature that is contemplated is the ability to turn-on or turn-off a subscriber's CATV service. This control feature may be implemented in a similar manner to the implementation of the alarm features as explained above. Thus, if the CATV service provider has not been paid by a subscriber, the service provider may send signals through the fiber in the loop optical network unit to control process 60 so as to activate a program in the control process 60 that results in service to the particular device being cut off. The service is cut off at the interface 44. Once the subscriber pays his/her CATV invoice, the service provider may (if it has been paid enough) send signals through to control process 60 so as to activate a program that results in service to the particular device being turn-on. Advantageously, by the use of this exemplary control feature, the CATV service provider does not have to send personnel to the location of the device to turn on or to turn off the service. Thus, the CATV service provider saves money and offers better service to its subscribers.

An additional control feature that is contemplated is a monitoring feature. With this monitoring feature, a service provider may receive digitized signals representing monitoring data reporting the health of the video signals being provided on the downstream path to one or more devices. Conveniently, the service provider may receive these digitized signals at a remote location. This monitoring feature is preferably implemented in the same manner as the control features described in the immediately preceding paragraph.

Another feature of the preferred embodiment of the present invention is the drop test unit 58. As illustrated in FIG. 4, this drop test unit 58 is adapted for use in the optical network unit 32 and generally operates through a connection to the broadband communications module 14. This drop test unit 58 electrically tests the "drop" to the device. The drop test unit accesses the control drop on an individual basis and measures the electrical characteristics of the drop. In addition, the drop test unit 58 may include programming features such that upon receipt of activation signals from a service provider, the drop test unit 58, may be able to interact with a coaxial cable interface 44 to a device 16 to check for continuity. For example, a continuity check may include a check of whether the coaxial cable is connected or connected properly to the set top box. Thus, when a subscriber calls a CATV service provider to complain about a malfunctioning television, the CATV service provider can use the continuity check procedure to determine whether the problem is associated with CATV service.

The testing processes provided by the present invention allow a service provider to determine the nature of a problem plaguing a subscriber. With the present invention, the service provider is able to make a more specific determination of the nature of a problem than prior art systems. As a result of the more specific determination, the service provider may react more quickly to the specific problem and solve it more quickly than with prior art systems. For example, as a result of the testing features of the present invention, the service provider is able to send the right service crew, if necessary, to the device's location. In other words, the service provider is able to make a more intelligent dispatch of a service crew. No longer will a technician in a fancy uniform, penny loafers and a manicure be dispatched to a problem that requires a technician in work coveralls, boots and a shovel. Thus, the present invention allows the service provider to provide better service and in a more efficient, cost saving manner.

Alternate Embodiments of the Signal Transport System of the Present Invention

Figure 5A:
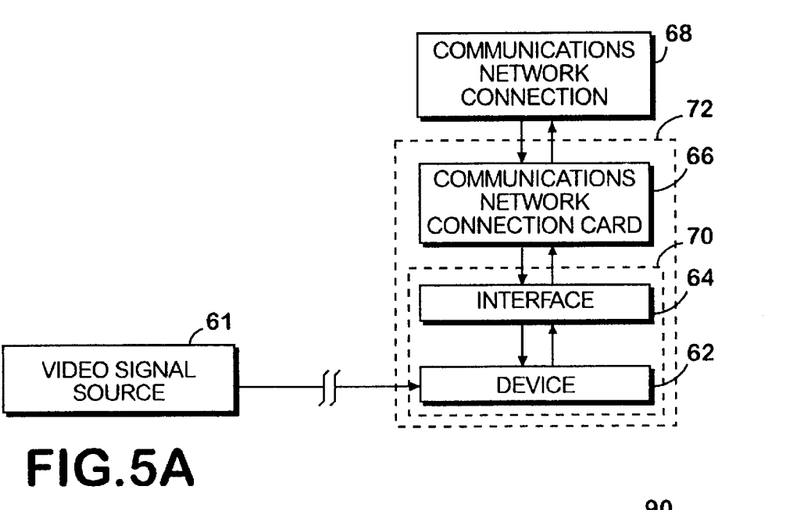
FIGS. 5A and 5B are block diagrams of alternate embodiments of the signal transport system of the present invention.
Figure 5B:
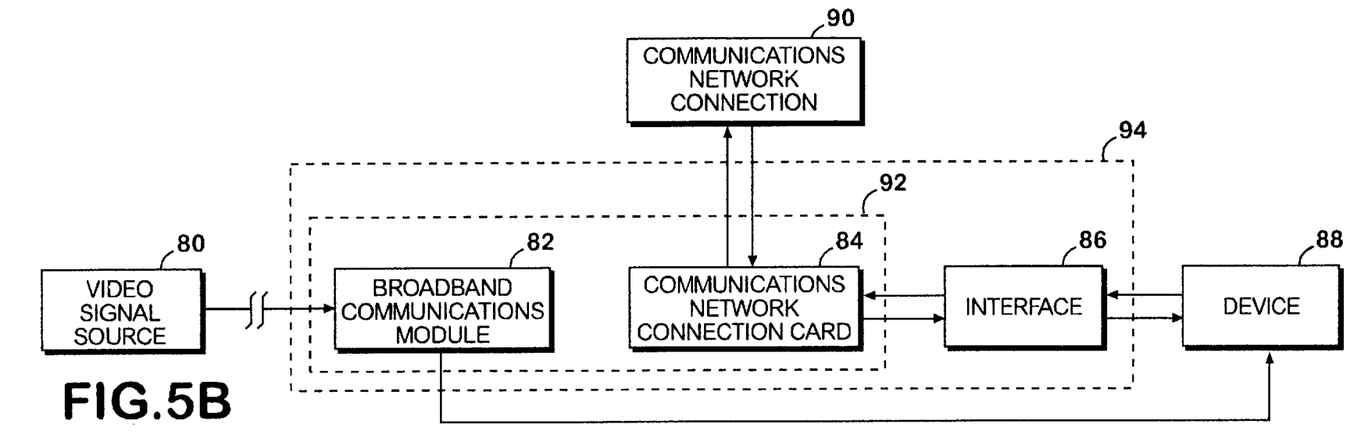

FIGS. 5A and 5B illustrate alternate embodiments of the signal transport system of the present invention. In the embodiment illustrated in FIG. 5A, a broadband communications module has not been included as part of the return path of signals, and/or the downstream path of signals. In this embodiment, the video signal source 61 delivers signals to a device 62. The break in the transmission line between the video signal source 61 and the device 62 indicates that other elements may be present between these two elements, but are not shown in this drawing. One or more of these elements may include a broadband communications module. With respect to a return path, the device directly provides digital signals to an interface 64, rather than providing the analog signals to a broadband communications module as illustrated in FIGS. 2–4. As indicated by the dashed block 70, the interface may be adapted for use in the device 62. Still referring to FIG. 5A, the interface 64 transmits the into digital signals in a communications network connection format to a communications network connection card 66. As indicated by the dashed block 72, the interface 64 and the communications network connection card 66 may be adapted for use in the device 62. Alternatively, the communications network connection card 66 may be adapted for use in the device 62 with the interface 64 being a separate element or otherwise disposed for use in the present invention. Preferably, the communications network connection card 66 is operative to transmit the digital signals in the communications network connection format to the communications network connection 68.

In the embodiment illustrated in FIG. 5B, a video signal source 80 delivers signals to a broadband communications module 82. The break in the transmission line between video signal source 80 and broadband communications module 82 indicates that other elements may be present between these two elements, but are not shown in this drawing. In this embodiment, broadband communications module 82 provides video signals received from video signal source 80 to a device 88. With respect to a return path, in contrast to embodiments described in connection with FIGS. 2–4, the device 88 provides analog signals (preferably modulated analog signals including digital content) to an interface 86. The interface 86 preferably converts the analog signals into digital signals in a communications network connection format and transmits the signals in the communications network connection format to a communications network connection card. 84. The card 84, in turn, then provides the converted signals to a communications network connection 90. As indicated by the dashed blocks 92 and 94, the communications network connection card 84 and the interface 86 may be included in different configurations of the present invention. For example, as indicated by dashed block 92, the communications network connection card 84 may be adapted for use with broadband communications module 82. As indicated by dashed block 94, the communications network connection card 84 and the interface 86 may be adapted for use in connection with the broadband communications module 82. Other configurations of the elements illustrated in FIGS. 5A and 5B will occur to those skilled in the art.

In summary, the present invention allows for a connection between CATV type services and communication services. In particular, the present invention allows for a connection between, on the one hand, CATV types services in the downstream path of video/data signal transmission to a device and, on the other hand, communication type services in the return path of the video/data signal transmission from the device. With this connection, the range of broadband services that are available to a subscriber is greatly expanded. In particular, the return path of the video/data signal transmission may include optical networks, such as fiber-in-the-loop networks, thereby providing the subscriber with communication services of great bandwidth capacity.

Advantageously, the present invention provides an improved return path that minimizes signal distortion of the signal transmission. In this return path, the analog signals from a device are converted to digital signals so as to allow for the transmission of signals to any wide bandwidth communication network through any suitable communications network connection card. In addition, the present invention provides a system that is relatively inexpensive to set up, that functions well with a minimum of equipment and minimum of modification to standard elements, and that is easy to maintain and service.

While this invention has been described in detail with particular reference to the preferred embodiments thereof, it will be understood that variations and modifications can be effected within the spirit and scope of the invention as described hereinabove and as defined in the appended claims.

I claim:

1. A signal transport system for the delivery of video signals in a downstream path to a plurality of devices, for the return of modulated analog signals having a digital content from at least one of the plurality of devices, and transmitting the modulated signals in an upstream path separate from the downstream path, through an optical network to a signal destination, comprising:

a video signal source operative for generating video signals to be transmitted over the downstream path;

an optical transmitter, operable for converting the video signal into an optical video signal, and transmitting the optical video signal over the downstream path; and a broadband communications module comprising:

an optical receiver operable for receiving the optical video signals from the optical transmitter on the downstream path, converting the optical video signal to an electrical video signal;

a filter operable for filtering the electrical video signal;

a coaxial cable interface operable for transmitting the electrical video signal to a plurality of devices and receiving the return modulated analog signals having a digital content from the device and transmitting the return analog signals to the filter; and a converter operable for converting the modulated analog signal into a digital signal and transmitting the converted signal to an optical network unit for transmission of the digital signal to the signal destination through the upstream path.

2. The system of claim 1, wherein said broadband communications module further comprises:

a coaxial cable interface operable for receiving the modulated analog signals having digital content from the device and transmits the modulated analog signals having digital content to a filter; and a converter operable for converting the modulated analog signals having digital content to digital signals.

3. The system of claim 2, wherein said converter formats said digital signals in a communications network connection format and wherein said converter transmits said digital signals in said communications network connection format to a communications network connection card.

4. The system of claim 3, wherein said communications network connection card is adapted for use in said optical network unit.

5. The system of claim 3, wherein said communications network connection card transmits said digital signals in said communications network connection format to an optical receiver/transmitter.

6. The system of claim 3, wherein said communications network connection card transmits said digital signals in said communications network connection format to a communications network.

7. The system of claim 1, further comprising an alarm monitoring system, said alarm system being functionally connected through said optical network unit and said broadband communications module to said device and said alarm monitoring system being operative to monitor a radio frequency output to trigger an alarm upon degradation of said output delivered to said device or to trigger said alarm upon degradation of an optical signal input to said broadband communication module.

8. The system of claim 1, further comprising a control feature with respect to said video signals delivered to said device.

9. The system of claim 8, wherein said control feature is a turn-on feature or a turn-off feature, whereby said video signals may be, respectively, turned-on for delivery to said device, or turned-off for delivery to said device.

10. The system of claim 1, further comprising a drop test unit, said drop test unit being functionally connected through said broadband communications module to said device and said drop test unit being operative to test the electrical characteristics of said video signals provided in said downstream path from said signal source through said broadband communications module to said device or to conduct a continuity check with respect to said video signals.

11. A broadband communications module for use in a signal transport system, comprising:

an optical receiver operable for receiving optical video signals from an optical transmitter on a downstream path, converting the optical video signal to an electrical video signal, and delivering the electrical video signals on a downstream path to a plurality of device;

a filter operable for filtering the electrical video signals;

a coaxial cable interface operable for transmitting the electrical video signal to a plurality of devices and receiving a return modulated analog signal from at least one of the plurality of devices, the return modulated analog signal having a digital content from the device and transmitting the return analog signals to the filter; and a converter operable for converting the modulated analog signal into a digital signal and transmitting the converted signal to an optical network unit for transmission of the digital signal to the signal destination through the upstream path.

12. A signal transport system for the delivery of video signals to a plurality of devices, for the return of modulated analog signals from at least one of the plurality of devices, converting the modulated analog signals into digital signals, and transmitting the digital signals to a signal destination, comprising:

a video signal source operable for generating a plurality of video signals;

a broadband communications module operable for;
  receiving the plurality of video signals;
  transmitting the video signals to at least one device; and
  receiving the modulated analog signals having digital content from at least one of the plurality of devices;

a downstream path for carrying the electric video signals to the broadband communications module;

an interface for converting the analog signals to digital signals;

an optical network unit operable for converting the digital signals from the interface into optical signals; and an upstream path connected to the optical network unit for carrying the optical signals to the destination device.

13. The system of claim 12, wherein the broadband communications module further comprises:

a coaxial cable interface operable for receiving the modulated analog signals from the device; and a filter operable for filtering unwanted signals from the modulated analog signals and transmitting the filtered signals to the interface.

14. The system of claim 12, wherein the interface further comprises a converter to convert the modulated analog signals to the digital signals.

15. The system of claim 14, wherein the converter is operable for:

formatting the digital signals in a communications network connection format;

transmitting the digital signals in the communications network connection format to a communications network connection card; and transmitting the digital signals in the communications network connection format to an optical receiver/transmitter in the optical network unit.

16. The system of claim 12, further comprising an alarm monitoring system, the alarm monitoring system being functionally connected through the optical network unit and the broadband communications module to the device and the alarm monitoring system being operable for monitoring a radio frequency output to trigger an alarm upon degradation of the output delivered to the device or to trigger the alarm upon degradation of an optical signal input to the broadband communication module.

17. The system of claim 12, further comprising a control feature with respect to the signals delivered to the device, wherein the control feature is a binary feature operable for enabling or disabling the delivery of the video signal to the device.

18. The system of claim 12, further comprising a drop test unit, the drop test unit being functionally connected through the broadband communications module to the device and the drop test unit being operative to test the electrical characteristics of the video signals provided in the downstream path from the signal source through the broadband communications module to the device or to conduct a continuity check with respect to the video signals.

* * * * *